United States Patent [19]

Hayes et al.

[11] Patent Number: 4,836,423

[45] Date of Patent: Jun. 6, 1989

[54] PUMP DISPENSER PACKAGE

[75] Inventors: Thomas H. Hayes; Lewis C. Lo Maglio, both of Lancaster, Ohio

[73] Assignee: Anchor Hocking Corporation, Lancaster, Ohio

[21] Appl. No.: 186,262

[22] Filed: Apr. 26, 1988

[51] Int. Cl.[4] .............................................. G01F 11/00
[52] U.S. Cl. .................................. 222/257; 222/145; 222/383; 222/519; 222/531; 222/508
[58] Field of Search ............... 222/386, 385, 387, 505, 222/507, 508, 391, 519, 526, 531, 533–534, 256, 257, 259, 260, 129, 145

[56] References Cited

U.S. PATENT DOCUMENTS

| 3,094,255 | 6/1963 | Hunter | 222/507 |
| 3,276,641 | 10/1966 | Lehmann | 222/526 |
| 3,371,827 | 5/1968 | Micallef | 222/536 |
| 4,461,403 | 7/1984 | Prahs | 222/391 |
| 4,629,097 | 12/1986 | Moore | 222/386 |
| 4,684,044 | 8/1987 | Foster | 222/386 |
| 4,775,080 | 10/1988 | Mettenbrink | 222/391 |
| 4,779,773 | 10/1988 | Bennett | 222/507 |

Primary Examiner—Joseph J. Rolla
Assistant Examiner—Boris Milef
Attorney, Agent, or Firm—Stoll, Previto & Hoffman

[57] ABSTRACT

The preferred package of this invention has a fluent or paste containing body portion with a pump, nozzle and cover combination mounted at its top. The cover is rotatably mounted on the body portion of the container so that it may be turned through a half turn from a nozzle closed position to a nozzle open dispensing position. The nozzle is coupled to a pump and cover so that the cover in its open position is pressed up and down moving the nozzle and pump in a pumping motion for dispensing the fluent from the container. An object of the invention is providing a container with a rotatable cover which is manipulated both for opening and closing the nozzle and for product dispensing.

14 Claims, 3 Drawing Sheets

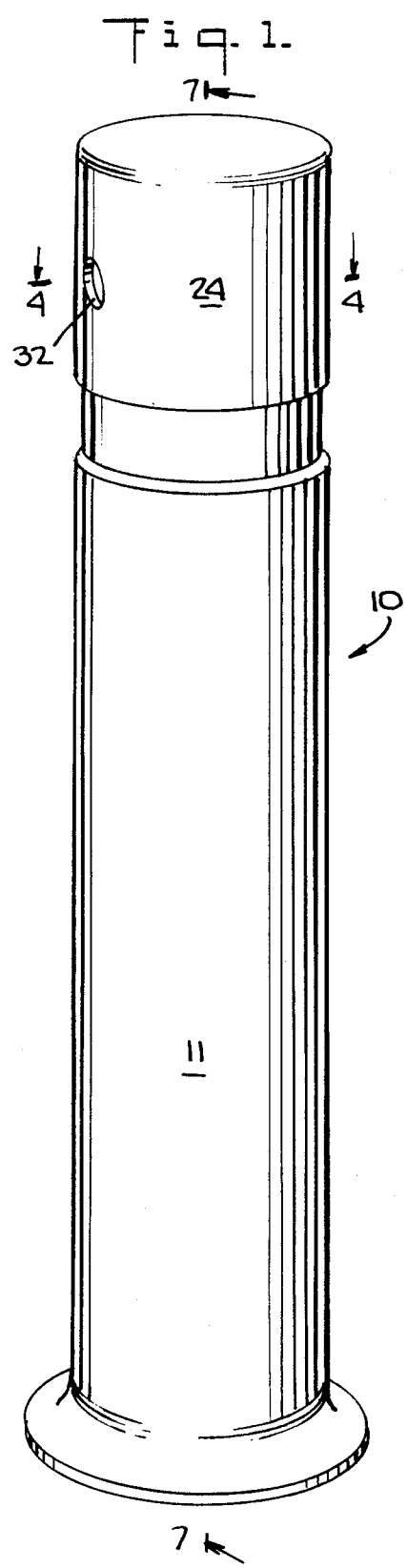
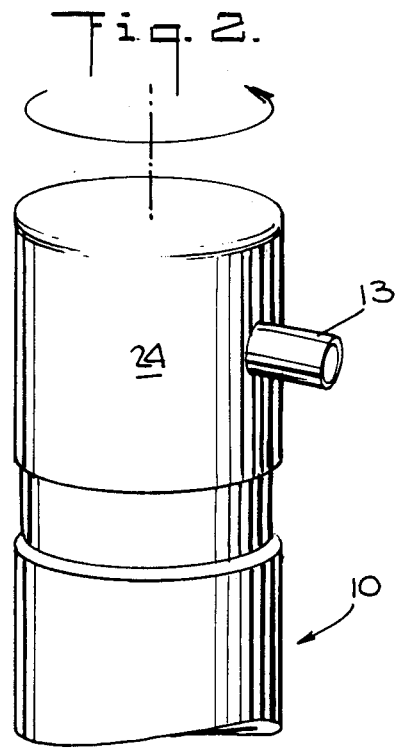
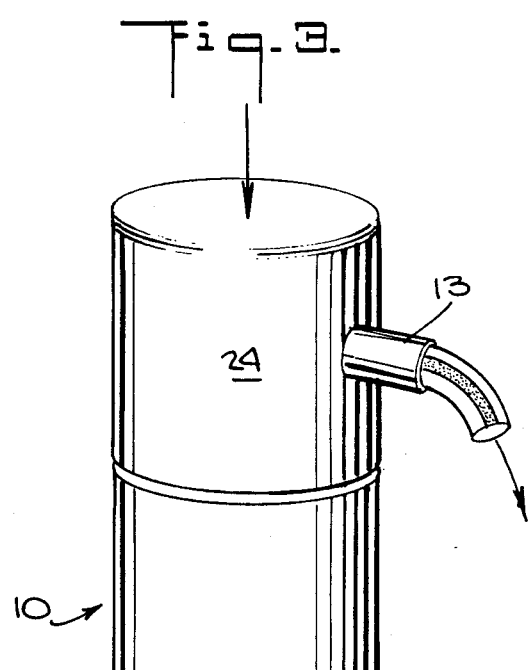

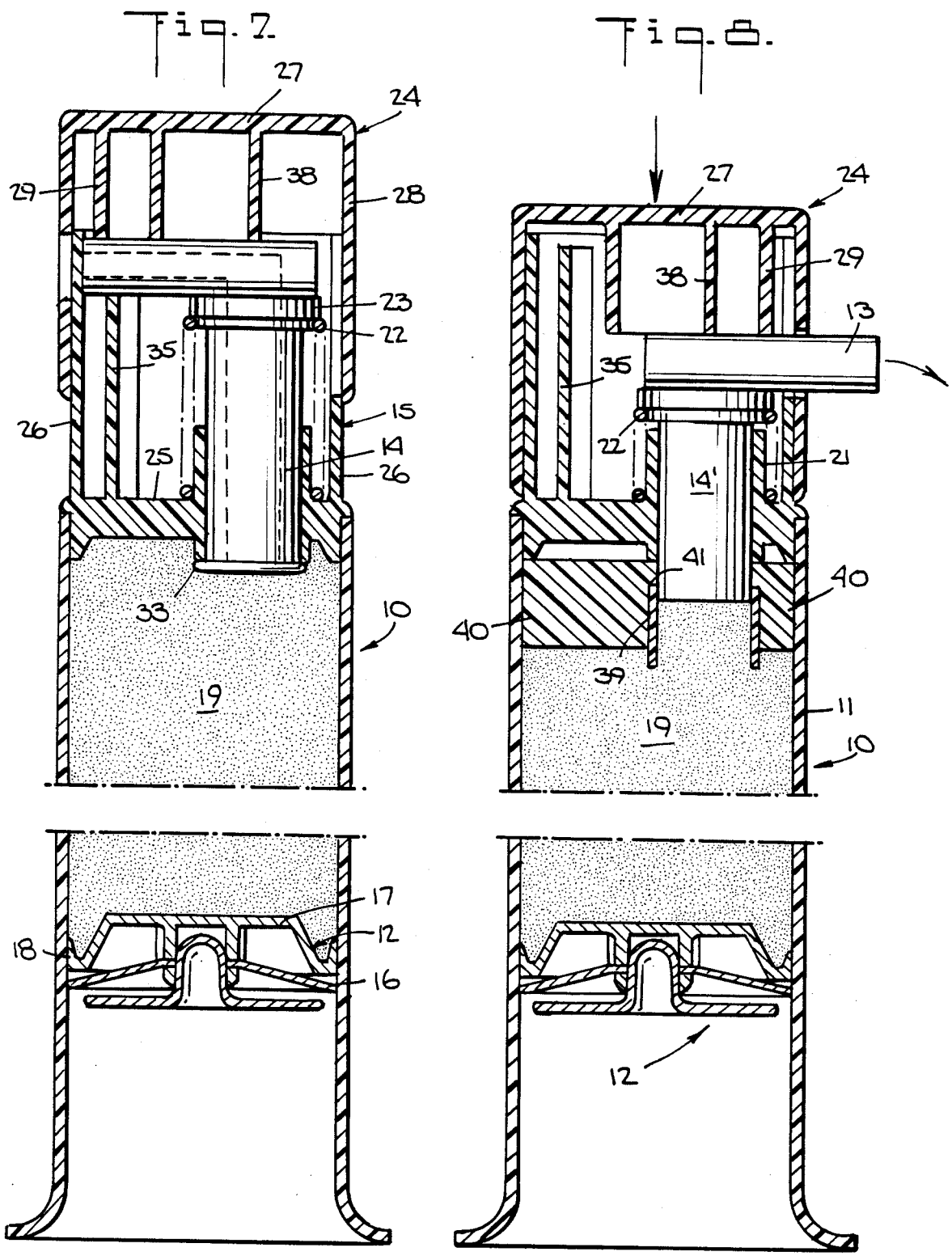

PUMP DISPENSER PACKAGE

BACKGROUND OF THE INVENTION

The present invention relates to pump dispensers for fluent materials, and more particularly to a container from which the fluent material is discharged by a pump actuated by the container cover.

There are prior patents in which the squeezing of an elastic container, or pressing of a plunger into an upper portion of the container forces a fluent mass through a discharge outlet.

In the present invention, however, a combined pump and nozzle element is turned from a closed position to a dispensing position and is actuated by a movable package cover. The discharge nozzle is open continuously but has an outlet shielding member protecting the fluent material in the nozzle when it is moved to the stored U position. The viscosity of the fluent material in the container plus the shield causes the fluent material to resist withdrawal back through the nozzle while atmospheric pressure acting upon a follower piston in the container moves the piston against the fluent mass.

The preferred package of this invention has a fluent or paste containing body portion with a pump, nozzle and cover combination mounted at its top. The cover is rotatably mounted on the body portion of the container so that it may be turned through a half turn from a nozzle closed position to a nozzle open dispensing position. The nozzle is coupled to a pump and cover so that the cover in its open position is pressed up and down moving the nozzle and pump in a pumping motion for dispensing the fluent from the container. An object of the invention is providing a container with a rotatable cover which is manipulated both for opening and closing the nozzle and for product dispensing.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a perspective view of the package of the invention.

FIG. 2 is a fragmentary perspective view of the package in its opened dispensing condition.

FIG. 3 is a fragmentary perspective view illustrating the package cover in its downward or dispensing position with a striped product being dispensed from the package nozzle.

FIG. 7 is a vertical sectional view of the container taken along line 7—7 on FIG. 1.

FIG. 8 is a corresponding vertical sectional view with the cover and interconnected pump in their lowered position and illustrating another embodiment incorporating a product striping means within the container.

DESCRIPTION OF THE PREFERRED EMBODIMENT

Figure 4:
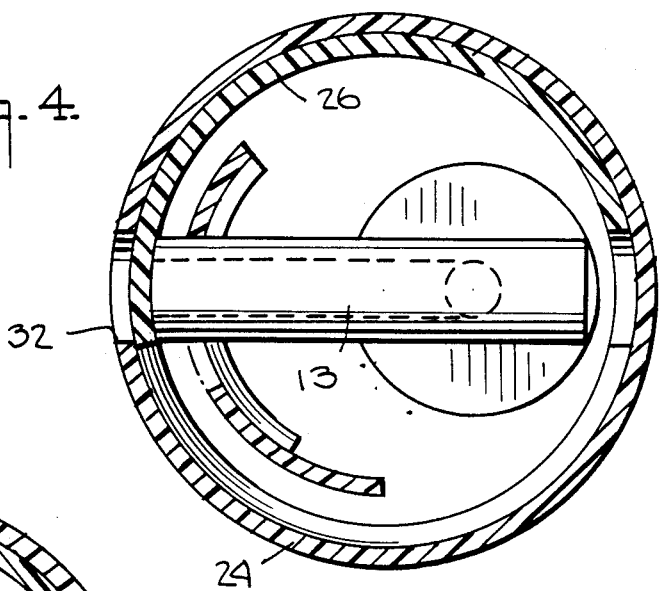
FIG. 4 is a sectional view taken along line 4—4 on FIG. 1 illustrating the nozzle in its closed position.

As illustrated in the drawings, the dispenser includes a container 10 of any suitable material with a body 11 of cylindrical shape which is adapted to contain a fluent or paste-like product such as toothpaste, a cosmetic, syrup, molasses, honey, or similar material of relatively high viscosity.

As described hereinbelow, a follower 12 is movable in an upward forward direction, after dispensing of a portion of the fluent mass or material from the container 10, being caused to move upwardly in the container a distance corresponding to the volume of the fluent material discharged through a nozzle 13. A pump 14 mounting head 15 is secured to or formed as the forward end of the container body 11.

Air at atmospheric pressure shifts the follower or piston 12 in a forward direction and its return movement in the container 10 is prevented by a one-way latch 16 forming part of the piston 12. The piston 12 includes a main body 17 having a central hub and an outer rim. The main body 17 may be made of a suitable material, such as polyethylene, being provided with a forward seal 18 extending laterally outwardly.

The seal 18 sealingly engages the inner wall of the cylindrical container body 11 and is forced by the pressure of the fluent mass 19 in the container 10 to prevent leakage rearwardly past the piston 12.

The latch 16 moves in a forward direction within the container 10 under the influence of atmospheric pressure, and any tendency of the latch 16 to move rearwardly in the container 10 causes the outer ends of the latch 16 to grip or latch against the inner wall of the container 10. The one-way follower or piston 16 moves forwardly within the container 10 but is prevented from moving rearwardly. The one-way latch device 16 is made of a suitable flexible material, such as steel, phosphor, bronze, acetal, and the like.

The nozzle 13 comprises a hollow molded plastic member communicating with a downwardly depending hollow pump 14. The pump 14 is slideably mounted in a bearing 21 molded on the container head 15. The head 15 may be separately molded and attached to the cylindrical body 11, or the head 15 and body 11 may be molded as a unit. The pump 14 is urged toward its raised position by a coil spring 22 positioned between the head 15 and a flange 23 formed at the junction of the nozzle 13 and the pump 14. When the pump 14 is moved downwardly against the force of the coil spring 22, the lower portion of the pump 14 enters the fluent material 19 in the body forcing it upwardly through the pump 14 and out of the nozzle 13. A bead 33 determines the upper position of the pump 14.

The package head 15 and the cooperating package cover 24 which act to provide for the pumping action as well as the nozzle opening and closing actions will now be more fully described.

Whether formed integrally with the package body 11 or separately, the head 15 has a horizontal end portion 25 closing the top of the package body 11. Extending upwardly from the end portion 25 is an outer cylindrical cover mounting portion 26 which rotatably mounts the cup shaped cover 24. The cover 24 has a top 27 and a depending skirt 28 slidably engaging the cover mounting portion 26 on the head 15 so that the cover 24 may be moved upwardly and downwardly as well as rotated relative to the head 15.

The cover 24 has a depending arcuate nozzle control member 29 (FIGS. 4 thru 7) with a drive portion 30 adjacent a nozzle opening 31. Rotation of the cover 24 from its closed position of FIG. 1 and 4 causes the nozzle 13 to move through the opening 31 in member 29 and an opening 32 in the cover 24 as seen in FIGS. 5 and 6. The nozzle 13 movement outwardly of the container 10 results from the eccentric positioning of the nozzle 13 bearing 21 on the head 15.

A second drive portion 34 on the member 29 turns the nozzle 13 back to its closed position when the cover 24 is rotated back to the closed position.

Figure 5:
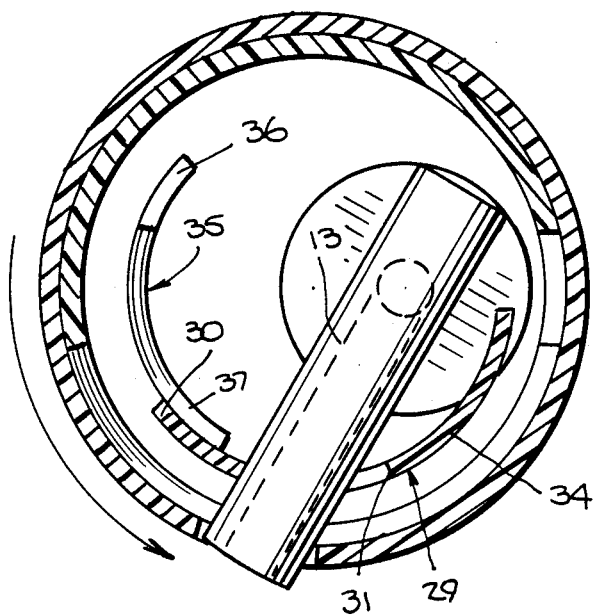
FIGS. 5 and 6 are sectional views based on FIG. 4 showing the nozzle in partially opened and fully opened positions respectively.
Figure 6:
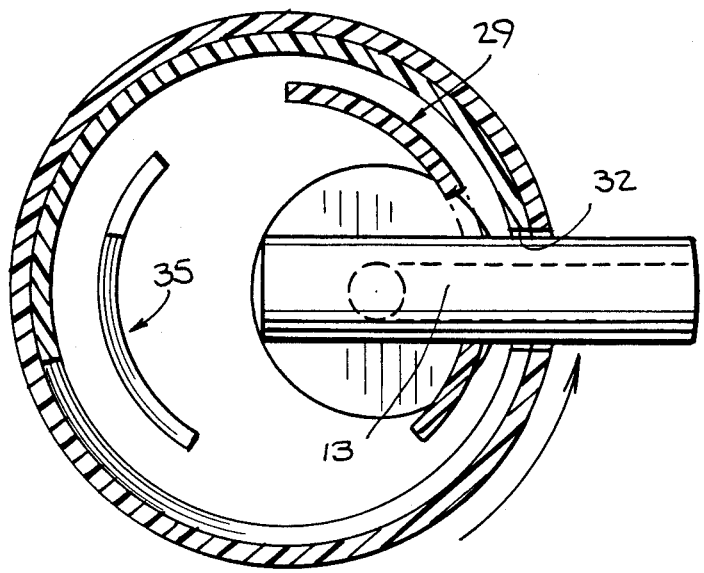

A stop and pump controlling member 35 is positioned on the cover 25 inwardly of the control member 29 as best illustrated in FIGS. 4 thru 7. This upstanding arcuate member 35 has a raised end portion 36 which terminates the rotation of the cover at its closed position as illustrated in FIG. 4 by engaging the outer end of the nozzle 13. A lower rail portion 37 of the controlling member 35 engages the bottom of the nozzle 13 to hold it in its raised position in the nozzle closed position, as seen in FIG. 4, as well as during the initial portion of the opening movement as the package cover 24 is turned counterclockwise through the positions illustrated in FIGS. 5 and 6. FIG. 5 illustrates the partially opened position and FIG. 6 illustrates the fully opened position of the package with the projecting nozzle.

FIG. 5 illustrates the nozzle 13 first entering the cover aperture 32 as the nozzle 13 is partially turned toward its dispensing position and FIG. 6 illustrates the nozzle fully extended through the aperture 32 in its final dispensing position after a half turn of the package cover 24.

A pusher 38 depending downwardly from a central portion of the package cap 24 operates to force the nozzle 14 downwardly during the pumping action as illustrated in FIG. 8.

In its closed position, the opening 38 of the nozzle 13 is moved into sliding engagement with the top portion of the cover mounting portion 26. This acts as a partial seal for the nozzle 13 when the package is in its closed position.

FIG. 8 illustrating the package cover 24 in its lowest dispensing position illustrates a package similar to that of FIGS. 1 thru 7 with the further addition of a product striping element. The striping element comprises a generally cylindrical chamber 39 formed at the top of the package body 11 for containing the striping material 40. The striping material 40 is contained between the package body 11 outer walls and the chamber 39 surrounding the pump 14. A number of apertures 41 at the top of the inner wall pass the striping material 40 into the moving fluent material 19 as the package piston 12 moves upwardly after a pumping cycle. In this embodiment also illustrated in FIG. 3, the striping material 40 is mixed with the other material in providing a striped pumped product such as a striped toothpaste. The pump 14 (FIG. 8) is shorter than the pump 14 (FIG. 7) to provide a space beneath it in its raised position for entry of the striping material through the apertures 41.

As various changes may be made in the form, construction and arrangement of the invention and without departing from the spirit and scope of the invention, and without sacrificing any of its advantages, it is to be understood that all matter herein is to be interpreted as illustrative and not in a limiting sense.

Having thus described our invention, we claim:

1. An improved pump dispenser package for a fluent material comprising the combination of:
   a body for the fluent material;
   a reciprocating pump mounted on one end of the body;
   the opposite end of the body in communication with the atmosphere;
   a nozzle with an outlet positioned on the pump;
   a piston in said body movable against the fluent material toward said pump;
   means on said piston for restricting its movement away from said nozzle;
   a hollow cover mounted on said body adjacent said nozzle for rotational and reciprocal motion;
   said cover operatively coupled to said pump for reciprocating said pump; and
   means for moving said nozzle outlet into and out of said cover during a rotary movement of said cover.

2. The package claimed in claim 1 which further comprises means for striping said fluent material positioned in said body adjacent said pump.

3. The package as claimed in claim 1 which comprises means for covering the nozzle outlet when the nozzle is within said cover.

4. The package as claimed in claim 1 in which said nozzle moving means comprises an eccentric mounting for the pump on the container.

5. The package as claimed in claim 1 in which said means for restricting the movement of said piston away from said nozzle comprises a resilient latch.

6. The package as claimed in claim 1 which further comprises resilient spring means for urging said pump from the fluent material.

7. The package as claimed in claim 1 in which said cover comprises an aperture for passing said nozzle to a dispensing position.

8. The package as claimed in claim 1 in which said cover comprises a top, a depending skirt, and a pump pusher on the underside of said top.

9. An improved pump dispenser package for a fluent material comprising the combination of:
   a body for the fluent material;
   a reciprocating pump mounted on one end of the body;
   the opposite end of the body in communication with the atmosphere;
   a nozzle with an outlet positioned on the pump;
   a piston in said body movable against the fluent material toward said pump;
   means on said piston for restricting its movement away from said nozzle;
   a hollow cover mounted on said body adjacent said nozzle for rotational and reciprocal motion;
   said cover operatively coupled to said pump for reciprocating said pump;
   means for moving said nozzle into and out of said cover during a rotary movement of said cover;
   means in said body adjacent to said pump for striping the fluent material passing through said pump; and
   means on said body for shielding the end of said nozzle outlet when the nozzle is within said cover.

10. The package as claimed in claim 9 in which said nozzle moving means comprises an eccentric mounting for the pump of the container.

11. The package as claimed in claim 9 in which said means for restricting the movement of said piston away from said nozzle comprises a resilient latch.

12. The package as claimed in claim 9 which further comprises resilient spring means for urging said pump from the fluent material.

13. The package as claimed in claim 9 in which said cover comprises an aperture for passing said nozzle to a dispensing position.

14. The package as claimed in claim 9 in which said cover comprises a top, a depending skirt, and a pump pusher on the underside of said top.

* * * * *